United States Patent [19]

Ueno et al.

[11] 4,130,549
[45] Dec. 19, 1978

[54] PROCESS FOR PREPARING EPOXY RESINS FROM HYDROXY BENZOIC ACID AND BISPHENOL

[75] Inventors: Ryuzo Ueno, Nishinomiya; Hiroyasu Matsumoto, Sakai, both of Japan

[73] Assignee: Kabushiki Kaisha Venoseiyaku oyo Kenkyuso, Osaka, Japan

[21] Appl. No.: 879,520

[22] Filed: Feb. 21, 1978

[30] Foreign Application Priority Data

Mar. 7, 1977 [JP] Japan .................................. 52/23965

[51] Int. Cl.$^2$ ............................................ C08G 59/24
[52] U.S. Cl. .................................. 528/93; 260/348.59; 260/830 TW; 528/95; 528/100
[58] Field of Search ....... 260/47 EP, 348.59, 830 TW

[56] References Cited

U.S. PATENT DOCUMENTS

| | | | |
|---|---|---|---|
| 2,703,765 | 3/1955 | Osdal ........................................ 117/75 |
| 3,067,171 | 12/1962 | Hoppe ........................................ 260/47 |
| 3,316,277 | 4/1967 | Frank et al. ........................... 260/348 |
| 3,404,018 | 10/1968 | Hicks ........................................ 106/252 |
| 3,409,590 | 11/1968 | Landua et al. ........................... 260/47 |

FOREIGN PATENT DOCUMENTS 47-32758 8/1972 Japan.
50-145498 11/1975 Japan.

Primary Examiner—Harold D. Anderson
Assistant Examiner—E. A. Nielsen
Attorney, Agent, or Firm—Sherman & Shalloway

[57] ABSTRACT

A process for preparing an epoxy resin, which comprises reacting p-hydroxybenzoic acid and bisphenol A with an epihalohydrin in the presence of a base using a quaternary ammonium salt as a catalyst, the amount of the p-hydroxybenzoic acid being 10 to 90 mole% and the amount of the bisphenol A being 90 to 10 mole%, both based on the total amount of the hydroxybenzoic acid and bisphenol A.

5 Claims, No Drawings

PROCESS FOR PREPARING EPOXY RESINS FROM HYDROXY BENZOIC ACID AND BISPHENOL

This invention relates to a process for producing an epoxy resin by reacting p-hydroxybenzoic acid and bis-phenol A with an epihalohydrin.

Epoxy resins from bisphenol A, i.e. epoxy resins prepared by using 2,2-bis(4'-hydroxyphenyl)propane as a phenol component, have found extensive use. Cured products of these resins exhibit superior mechanical characteristics, but have unsatisfactory chemical resistance. These resins are known to be highly viscous, and to have a tendency to crystallization on standing at room temperature or in the outer atmosphere during the wintertime. Because of their high viscosity, they scarcely cure at low temperatures.

It is an object of this invention to provide an epoxy resin which has the superior characteristics of the epoxy resins from bisphenol A and is free from the afore-said defects.

We have found that this object can be achieved by using both bisphenol A and p-hydroxybenzoic acid as a phenol component in the production of epoxy resins.

The present invention provides a process for producing an epoxy resin which comprises reacting p-hydroxybenzoic acid and bisphenol A with an epihalohydrin in the presence of a base using a quaternary ammonium salt as a catalyst.

In the above reaction, 10 to 90 mole% of p-hydroxybenzoic acid and 90 to 10 mole% of bisphenol A are used. The preferred proportion is 30 to 90 mole% for the former and 70 to 10% for the latter. The especially preferred proportion is 35 to 80 mole% for the former and 65 to 20 mole% for the latter.

The epihalohydrin is, for example, epichlorohydrin or epibromohydrin, and the use of epichlorohydrin is especially preferred. The amount of the epihalohydrin used is at least 2 moles, preferably 4 to 20 moles, per mole of the p-hydroxybenzoic acid and bisphenol A combined. The unreacted epihalohydrin can be recovered easily after the reaction, and can be again used in the reaction.

Examples of suitable quaternary ammonium salts as the catalyst are tetraalkyl-type compounds such as tetramethyl ammonium chloride and tetraethyl ammonium hydroxide, and benzyltrialkyl-type compounds such as benzyltrimethyl ammonium chloride and benzyltrimethyl ammonium acetate. The amount of the quaternary ammonium salt used is 1 to 50 mole%, preferably 3 to 20 mole%, based on the total amount in moles of the p-hydroxybenzoid acid and bisphenol A.

Examples of the base are inorganic bases such as alkali hydroxides and alkali carbonates and organic bases such as tertiary amines. The use of the alkali hydroxides is advantageous. Preferably, the base is used in an amount of 2 to 2.5 equivalents per mole of the p-hydroxybenzoic acid and bisphenol A combined. Of course, the base can be added even after the recovery of the epihalohydrin, and some change in the aforesaid amount is permissible.

The process of this invention is performed, for example, by adding p-hydroxybenzoic acid and bisphenol A, either separately or as a mixture, to the epihalohydrin, adding the quaternary ammonium salt dropwise under heat, adding an aqueous solution of the alkali hydroxide dropwise to allow the reaction to proceed, recovering the epihalohydrin after the reaction, adding water and a hydrophobic organic solvent such as benzene to the residue, shaking the mixture, and separating the organic solvent layer. In some cases, the base may be added to the organic solvent layer to perform the reaction further. Another feasible method comprises adding p-hydroxybenzoic acid and bisphenol A dissolved in about 1 equivalent weight, based on the total amount of the two reactants, of an aqueous solution of an alkali hydroxide to a liquid mixture of the epihalohydrin and quaternary ammonium salt to perform the reaction, further adding 1 equivalent weight of a solution of an alkali hydroxide, and heating the mixture for a short period. Other known methods can also be used in suitable combinations. The reaction temperature is usually 50° to 120° C., preferably 60° to 110° C. The product is isolated and purified in a customary manner.

Surprisingly, the epoxy resin obtained by the process of this invention has superior properties not seen in a mixture of an epoxy resin obtained by using p-hydroxybenzoic acid as a phenol component and an epoxy resin obtained by using bisphenol A as a phenol component. For example, as shown in Table 1, the epoxy resins of this invention obtained in the Examples given hereinbelow have viscosities in centipoises at 25° C. which are about 30 to 40% of those of the corresponding mixtures of epoxy resins from p-hydroxybenzoic acid and epoxy resins from bisphenol A. Furthermore, high-pressure liquid chromatograms of the epoxy resins obtained by the process of this invention show the presence of a peak which is not seen in the mixture of the two types of epoxy resins described above.

Table 1

| Example | Viscosities of the resins in the Examples (CPS, at 25° C) | Viscosities of the resin mixtures corresponding to the resins in the Examples (CPS, at 25° C) |
| --- | --- | --- |
| 1 | 3,520 | 9,200 |
| 2 | 3,980 | 10,800 |
| 3 | 1,930 | 5,300 |
| 4 | 3,400 | 9,700 |
| 5 | 3,270 | 9,400 |
| 6 | 4,000 | 12,200 |
| 7 | 5,500 | 13,600 |
| 8 | 1,530 | 3,900 |

Note:
The viscosity (at 25° C) of the epoxy resin from p-hydroxybenzoic acid is 1,200 centipoises, and the viscosity (at 25° C) of the epoxy resin from bisphenol A is 15,000 centipoises.

A cured product of the resin obtained by the process of this invention has a far better chemical resistance than a cured product of a resin prepared from bisphenol A and epichlorohydrin or an epoxy resin prepared from p-hydroxybenzoic acid and epichlorohydrin.

The various resins shown in Table 2 were allowed to stand at 20° C. for 7 days after addition of Epomate (a modified cycloaliphatic polyamine, a product of Mitsubishi Petrochemical Co., Ltd.) as a curing agent. The resulting cured products were each immersed in various chemicals for predetermined periods of time, and their increase in weight (%) was determined. The results are shown in Table 2. The epoxy resin from p-hydroxybenzoic acid had an epoxy equivalent of 150, and the epoxy resin from bisphenol A had an epoxy equivalent of 190.

Table 2

Chemical resistance

| | Epoxy resins of this invention | | | | | | | | Epoxy resin from p-hydroxy-benzoic acid | Epoxy resin from bis-phenol A |
|---|---|---|---|---|---|---|---|---|---|---|
| | Example 1 | Example 2 | Example 3 | Example 4 | Example 5 | Example 6 | Example 7 | Example 8 | | |
| in 10% H$_2$SO$_4$ | | | | | | | | | | |
| After 1 week | 0.03 | 0.06 | 0.05 | 0.03 | 0.03 | 0.09 | 0.12 | 0.08 | 0.20 | 0.17 |
| After 4 weeks | 0.09 | 0.14 | 0.12 | 0.10 | 0.08 | 0.17 | 0.24 | 0.15 | 0.38 | 0.33 |
| After 12 weeks | 0.12 | 0.20 | 0.15 | 0.14 | 0.11 | 0.41 | 0.50 | 0.28 | 0.70 | 0.61 |
| in 10% NaOH | | | | | | | | | | |
| After 1 week | 0.04 | 0.05 | 0.04 | 0.04 | 0.03 | 0.10 | 0.11 | 0.13 | 0.15 | 0.13 |
| After 4 weeks | 0.08 | 0.09 | 0.08 | 0.08 | 0.06 | 0.21 | 0.26 | 0.34 | 0.36 | 0.32 |
| After 12 weeks | 0.11 | 0.15 | 0.12 | 0.12 | 0.09 | 0.38 | 0.40 | 0.46 | 0.59 | 0.52 |
| in methyl ethyl ketone | | | | | | | | | | |
| After 1 week | 0.02 | 0.08 | 0.01 | 0.02 | 0.02 | 0.20 | 0.26 | 0.12 | 0.25 | 0.63 |
| After 4 weeks | 0.09 | 0.24 | 0.07 | 0.08 | 0.10 | 0.45 | 0.63 | 0.39 | 0.58 | 1.55 |
| After 12 weeks | 0.21 | 0.38 | 0.19 | 0.16 | 0.18 | 0.98 | 1.12 | 0.73 | 1.10 | 2.63 |
| in toluene | | | | | | | | | | |
| After 1 week | 0.02 | 0.02 | 0.02 | 0.02 | 0.01 | 0.02 | 0.03 | 0.02 | 0.02 | 0.03 |
| After 4 weeks | 0.03 | 0.04 | 0.03 | 0.03 | 0.02 | 0.07 | 0.12 | 0.06 | 0.09 | 0.15 |
| After 12 weeks | 0.04 | 0.05 | 0.04 | 0.04 | 0.03 | 0.11 | 0.15 | 0.09 | 0.12 | 0.23 |

Furthermore, the epoxy resins obtained by the process of this invention have higher speeds of curing than the epoxy resins from bisphenol A, and have the advantage of curing even at low temperatures. For example, when 50 g of each of these resins was cured at 20° C. using triethylene tetramine (TTA) as a curing agent, the required gel time was as shown in Table 3. The tensile shear strength of the cured product of the resin cured at 3 to 5° C. using the above-mentioned curing agent was as shown in Table 4.

Table 3

Gel time

| Resin | Gel time (minutes) |
|---|---|
| Example 1 | 50 |
| Example 2 | 48 |
| Example 3 | 30 |
| Example 4 | 48 |
| Example 5 | 48 |
| Example 6 | 54 |
| Example 7 | 56 |
| Example 8 | 30 |
| Epoxy resin from p-hydroxybenzoic acid | 30 |
| Epoxy resin from bisphenol A | 60 |

Table 4

Tensile shear strength

| Resin | Tensile shear strength (kg/cm$^2$) | |
|---|---|---|
| | after 1 day | after 3 days |
| Example 1 | 49.2 | 56.0 |
| Example 2 | 52.5 | 62.8 |
| Example 3 | 75.7 | 102.9 |
| Example 4 | 50.3 | 56.5 |
| Example 5 | 51.5 | 63.2 |
| Example 6 | 37.3 | 46.4 |
| Example 7 | 35.7 | 41.2 |
| Example 8 | 73.9 | 98.3 |
| Epoxy resin from p-hydroxybenzoic acid | 72.5 | 96.8 |
| Epoxy resin from bisphenol A | 28.0 | 30.0 |

Since the resins obtained by the process of this invention do not crystallize even at low temperatures as shown in Table 5 in addition to having low viscosities as shown in Table 1 hereinabove, they are very advantageous in storage and use.

Table 5

Crystallization

| Resin | Crystallization at −5 to 0° C. |
|---|---|
| Example 1 | Did not crystallize even after 6 months. |
| Example 2 | " |
| Example 3 | " |
| Example 4 | " |
| Example 5 | " |
| Example 6 | " |
| Example 7 | " |
| Example 8 | Suspending was seen after 6 months. |
| Epoxy resin from p-hydroxybenzoic acid | Crystallized in 1 day |
| Epoxy resin from bisphenol A | Crystallized in 2 weeks. |

A further advantage of this invention is that since the reaction with the epihalohydrin can be performed under relatively mild conditions, the yield of the epoxy resin is very good, and the ratio of the epihalohydrin recovered is extremely high. The process of this invention is also advantageous in regard to equipment and operability because it is not necessary to incorporate a high viscosity resin.

The epoxy resins obtained by the process of this invention are useful in the fields of, for example, structural materials, cast articles, adhesives, coatings, laminates, and paints.

The following Examples illustrate the present invention more specifically.

EXAMPLE 1

To 647.5 g of epichlorohydrin were added 69 g of p-hydroxybenzoic acid and 115 g of bisphenol A, and the mixture was heated to 80° C. Then, 14.2 g of a 60% aqueous solution of benzyltrimethyl ammonium chloride was added dropwise to the mixture over the period of 2 hours, and then the mixture was maintained at 80° C. for 1 hour. Subsequently, 160 g of a 50% aqueous solution of sodium hydroxide was added dropwise at the same temperature over the period of 3 hours. After the addition, the epichlorohydrin was recovered by distillation, and 1.3 liters of benzene was added to the residue. Sodium chloride which precipitated was removed by filtration. The filtrate was washed with 500 ml of water, and benzene was removed by distillation from the benzene layer to afford 286.2 g (yield 97%) of an epoxy resin having an epoxy equivalent of 180. The ratio of the epichlorohydrin recovered was 97% of theory.

EXAMPLE 2

To 647.5 g of epichlorohydrin were added 50.8 g of p-hydroxybenzoic acid and 144 g of bisphenol A, and 16.1 g of a 60% aqueous solution of benzyl trimethyl ammonium acetate was addded dropwise over the period of 2 hours. Subsequently, the procedure of Example 1 was repeated to afford 306.8 g (yield 100%) of an epoxy resin having an epoxy equivalent of 186. The ratio of the epichlorohydrin recovered was 97% of theory.

EXAMPLE 3

To 647.5 g of epichlorohydrin were added 104.9 g of p-hydroxybenzoic acid and 54.6 g of bisphenol A, and 11.4 g of a 60% aqueous solution of tetraethyl ammonium hydroxide was added dropwise over the period of 2 hours. Subsequently, the procedure of Example 1 was repeated to afford 263.5 g (yield 97%) of an epoxy resin having an epoxy equivalent of 160. The ratio of the epichlorohydrin recovered was 97% of theory.

EXAMPLE 4

To 647.5 g of epichlorohydrin were added 79.4 g of p-hydroxybenzoic acid and 96.9 g of bisphenol A, and the mixture was heated to 80° C. Then, 8.5 g of a 60% aqueous solution of tetramethyl ammonium chloride was added dropwise over the period of 2 hours. Subsequently, the procedure of Example 1 was repeated to afford 281.1 g (yield 97.5%) of an epoxy resin having an epoxy equivalent of 173. The ratio of the epichlorohydrin recovered was 97% of theory.

EXAMPLE 5

To 673.8 g of epichlorohydrin were added 65.7 g of p-hydroxybenzoic acid and 119.4 g of bisphenol A, and using 14.2 g of a 60% aqueous solution of benzyl trimethyl ammonium chloride and 161.6 g of a 48.5% aqueous solution of sodium hydroxide, the procedure of Example 1 was repeated. The epichlorohydrin was recovered, and 400 ml of water and 1,000 ml of benzene were added to the residue. They were well shaken, and the aqueous layer was removed. To the benzene layer was added 19.8 g of a 48.5% aqueous solution of sodium hydroxide, and the mixture was heated under reflux for 1 hour. After cooling, the benzene layer was washed three times with 400 ml of water each time. The benzene was removed by distillation at reduced pressure to afford 288.3 g (yield 97%) of an epoxy resin having an epoxy equivalent of 170 and a chlorine content of 0.47%. The ratio of the epichlorohydrin recovered was 95% of theory.

To 100 parts of the resulting resin was added 30.2 parts of 4,4'-diamino-diphenylmethane. The mixture was heated at 80° C. for 2 hours, and then at 150° C. for 3 hours to afford a cured product. The cured product had a heat distortion temperature of 161° C. This temperature value is substantially comparable to that of a cured product of a resin (epoxy equivalent 190) from bisphenol A.

EXAMPLE 6

To 647.5 g of epichlorohydrin were added 35 g of p-hydroxybenzoic acid and 170.3 g of bisphenol A, and the mixture was heated to 80° C. Subsequently, the procedure of Example 5 was repeated to afford 316.8 g (yield 99.8%) of an epoxy resin having an epoxy equivalent of 183 and a chlorine content of 0.5%. The ratio of the epichlorohydrin recovered was 95% of theory.

EXAMPLE 7

To 647.5 g of epichlorohydrin were added 18.2 g of p-hydroxybenzoic acid and 198.1 g of bisphenol A, and the mixture was heated to 80° C. Subsequently, the procedure of Example 5 was repeated to afford 325.4 g (yield 99.1%) of an epoxy resin having an epoxy equivalent of 181 and a chlorine content of 0.4%. The ratio of the epichlorohydrin recovered was 94.5%.

EXAMPLE 8

To 647.5 g of epichlorohydrin were added 116.6 g of p-hydroxybenzoic acid and 35.4 g of bisphenol A, and the mixture was heated to 80° C. Subsequently, the procedure of Example 5 was repeated to afford 256.5 g (yield 97%) of an epoxy resin having an epoxy equivalent of 155 and a chlorine content of 0.5%. The ratio of the epichlorohydrin recovered was 95%.

What we claim is:

1. A process for preparing an epoxy resin, which comprises reacting p-hydroxybenzoic acid and bisphenol A with an epihalohydrin in the presence of a base using a quaternary ammonium salt as a catalyst, the amount of the p-hydroxybenzoic acid being 10 to 90 mole% and the amount of the bisphenol A being 90 to 10 mole%, both based on the total amount of the hydroxybenzoic acid and bisphenol A.

2. The process of claim 1 wherein the quaternary ammonium salt is a benzyl trialkyl-type compound or a tetra-alkyl-type compound.

3. The process of claim 1 wherein the epihalohydrin is epichlorohydrin.

4. The process of claim 1 wherein the base is an alkali hydroxide.

5. The process of claim 1 wherein the reaction is carried out at 50° to 120° C.

* * * * *

UNITED STATES PATENT AND TRADEMARK OFFICE
CERTIFICATE OF CORRECTION

PATENT NO. : 4,130,549
DATED : December 19, 1978
INVENTOR(S) : UENO, ET AL.

It is certified that error appears in the above-identified patent and that said Letters Patent are hereby corrected as shown below:

Change item [73] on the first page to read as follows
--Assignee: Kabushiki Kaisha Ueno Seiyaku Oyo Kenkyujo, Osaka, Japan--

Signed and Sealed this

Twenty-seventh Day of March 1979

[SEAL]

Attest:

RUTH C. MASON
Attesting Officer

DONALD W. BANNER
Commissioner of Patents and Trademarks